United States Patent
Evans

(10) Patent No.: US 7,441,993 B2
(45) Date of Patent: Oct. 28, 2008

(54) MAKING CONNECTIONS TO PIPES UNDER PRESSURE

(75) Inventor: Keith Roderick Evans, Alford (GB)

(73) Assignee: Clear Well Subsea Limited, Aberdeen (GB)

( * ) Notice: Subject to any disclaimer, the term of this patent is extended or adjusted under 35 U.S.C. 154(b) by 137 days.

(21) Appl. No.: 10/476,448

(22) PCT Filed: May 2, 2002

(86) PCT No.: PCT/GB02/02008

§ 371 (c)(1),
(2), (4) Date: Oct. 30, 2003

(87) PCT Pub. No.: WO02/090814

PCT Pub. Date: Nov. 14, 2002

(65) Prior Publication Data

US 2004/0120779 A1    Jun. 24, 2004

(30) Foreign Application Priority Data

May 3, 2001    (GB) ................................ 0110821.6

(51) Int. Cl.
*B23B 35/00* (2006.01)
(52) U.S. Cl. ..................... 408/1 R; 137/318; 408/100; 408/138
(58) Field of Classification Search .............. 408/1 R, 408/79, 80, 99, 100, 130, 87, 92, 95, 97, 408/67, 204, 101, 102, 124, 137, 138; 137/315, 137/317, 318; 83/483–490
See application file for complete search history.

(56) References Cited

U.S. PATENT DOCUMENTS

| 2,024,390 | A | * | 12/1935 | Roesch ........................ 408/111 |
| 2,601,434 | A | * | 6/1952 | Du Bois ....................... 137/318 |
| 2,881,643 | A | * | 4/1959 | Haade .......................... 408/76 |
| 2,972,915 | A | * | 2/1961 | Milanovits et al. ........... 137/318 |
| 2,986,959 | A | * | 6/1961 | Van Scoy ...................... 74/841 |
| 3,289,420 | A | * | 12/1966 | Guy ............................ 405/226 |
| 3,354,951 | A | * | 11/1967 | Savage et al. ............... 166/341 |
| 3,614,252 | A | * | 10/1971 | Rose et al. ...................... 408/9 |
| 3,697,188 | A | * | 10/1972 | Pope ........................... 408/230 |
| 3,778,179 | A | * | 12/1973 | Rivas .......................... 408/206 |
| 3,804,545 | A |   | 4/1974 | Chistov et al. |
| 3,821,965 | A | * | 7/1974 | Reynolds ..................... 137/318 |
| 3,858,401 | A | * | 1/1975 | Watkins ................... 405/224.2 |

(Continued)

FOREIGN PATENT DOCUMENTS

EP    0206382    5/1986

(Continued)

*Primary Examiner*—Daniel W Howell
(74) *Attorney, Agent, or Firm*—Drinker Biddle & Reath LLP

(57) ABSTRACT

Methods and apparatus for making connections to pipes and pressure vessels while they are under pressure employs a first drive mechanism for delivering a cutting tool to the pipe or vessel wall and a second separate drive mechanism for powering the movement of the cutting tool through the wall. The long linear travel associated with the transit of the cutter to the wall is divorced from the short cutter travel required to perform the actual cuffing operation. This allows the two long and short travel systems to be designed independently of one another, and engineering compromises between them can be avoided.

25 Claims, 13 Drawing Sheets

U.S. PATENT DOCUMENTS

| | | | | |
|---|---|---|---|---|
| 3,922,107 | A * | 11/1975 | Fowler | 408/67 |
| 3,981,357 | A * | 9/1976 | Walker et al. | 166/359 |
| 4,081,039 | A * | 3/1978 | Wardlaw | 175/7 |
| 4,093,393 | A * | 6/1978 | Smith et al. | 408/67 |
| 4,161,229 | A * | 7/1979 | Mifsud | 181/114 |
| 4,765,173 | A * | 8/1988 | Schellstede | 72/325 |
| 5,241,896 | A * | 9/1993 | Braun et al. | 92/59 |
| 5,282,704 | A * | 2/1994 | Screen | 408/124 |
| 5,337,561 | A * | 8/1994 | Raghavan et al. | 60/421 |
| 5,439,331 | A * | 8/1995 | Andrew et al. | 408/8 |
| 5,522,302 | A * | 6/1996 | Yuda et al. | 91/533 |
| 5,601,284 | A * | 2/1997 | Blackwell et al. | 473/483 |
| 5,615,648 | A | 4/1997 | Ruoff et al. | |
| 5,653,560 | A * | 8/1997 | Weber et al. | 408/1 R |
| 5,735,645 | A * | 4/1998 | Dungs | 408/1 R |
| 5,857,335 | A * | 1/1999 | Tomoiu | 60/579 |
| 6,164,344 | A * | 12/2000 | Nickens et al. | 141/51 |
| 6,240,981 | B1 * | 6/2001 | Nickens et al. | 141/51 |
| 6,308,748 | B1 * | 10/2001 | Nickens et al. | 141/51 |
| 6,314,862 | B1 * | 11/2001 | Retterer | 92/62 |
| 6,551,034 | B1 * | 4/2003 | Nyhuis et al. | 408/129 |
| 6,640,827 | B1 * | 11/2003 | McClure | 137/318 |
| 6,648,562 | B1 * | 11/2003 | Calkins et al. | 408/67 |

FOREIGN PATENT DOCUMENTS

| | | | |
|---|---|---|---|
| GB | 1347758 | | 2/1974 |
| GB | 1458513 | | 4/1974 |
| GB | 2017223 | | 7/1978 |
| GB | 2092925 A | * | 8/1982 |
| GB | 2403512 A | * | 1/2005 |
| JP | 02311212 A | * | 12/1990 |
| JP | 19980268560 | | 9/1998 |
| JP | 2000097203 A | * | 4/2000 |
| JP | 2001162422 A | * | 6/2001 |
| SU | 909278 | | 2/1982 |

* cited by examiner

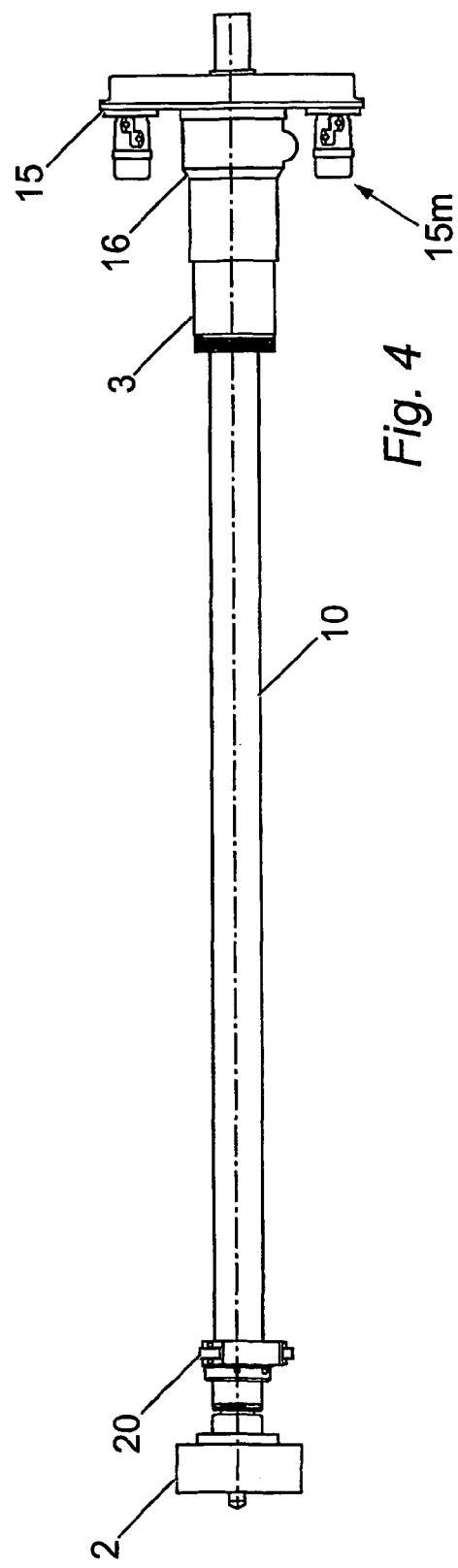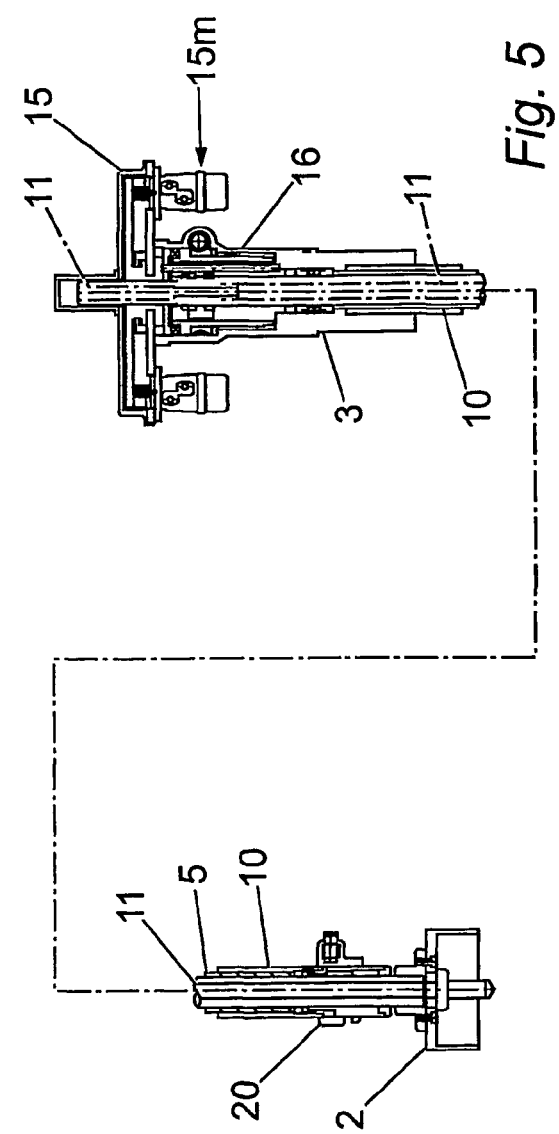

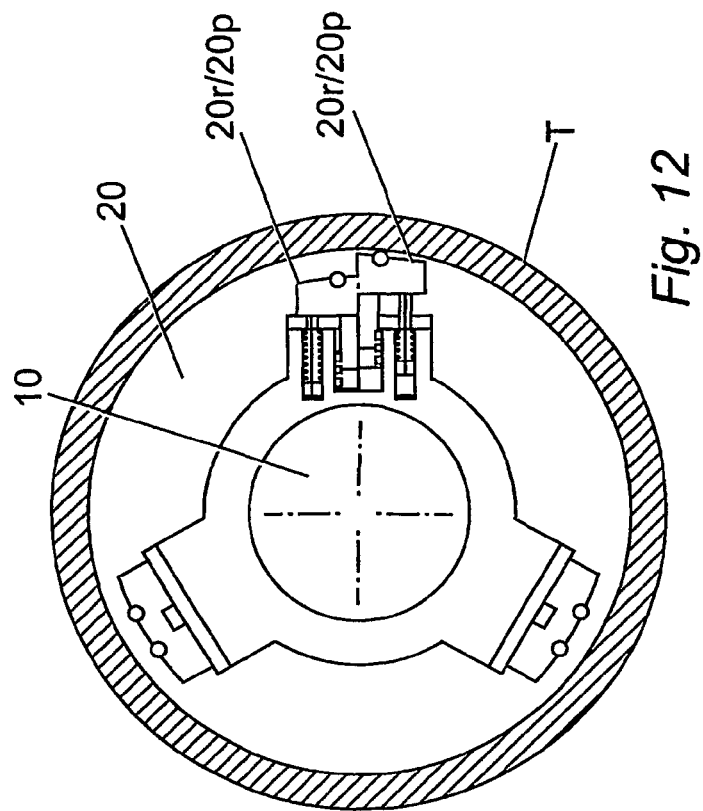
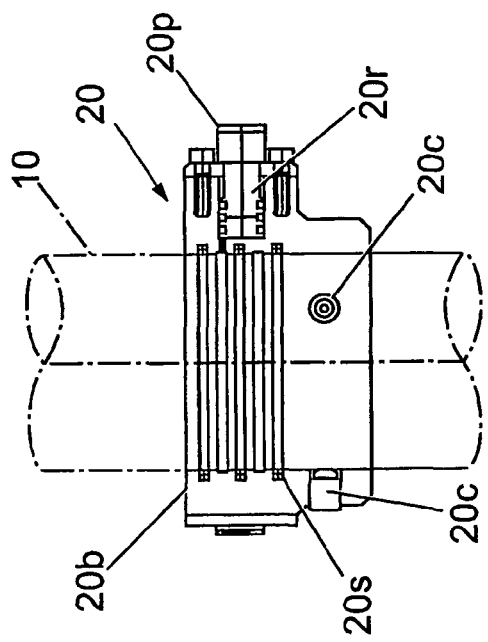
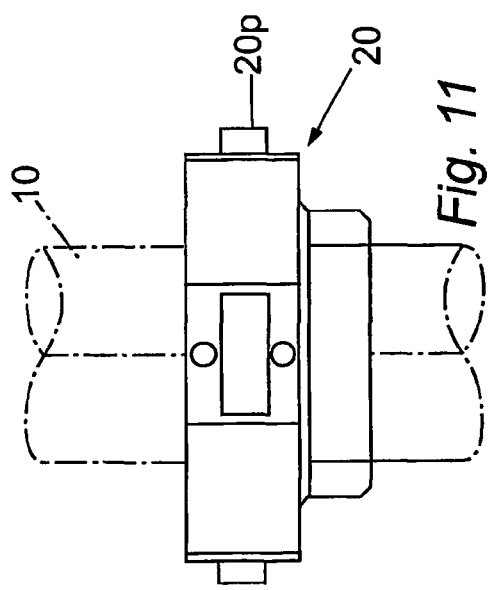

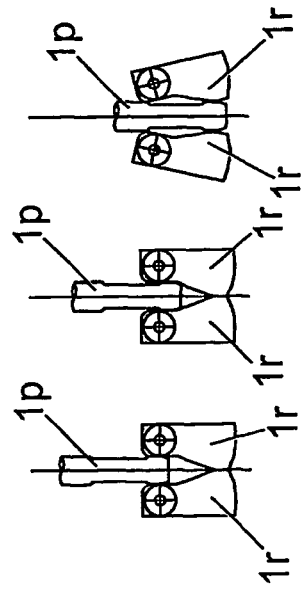 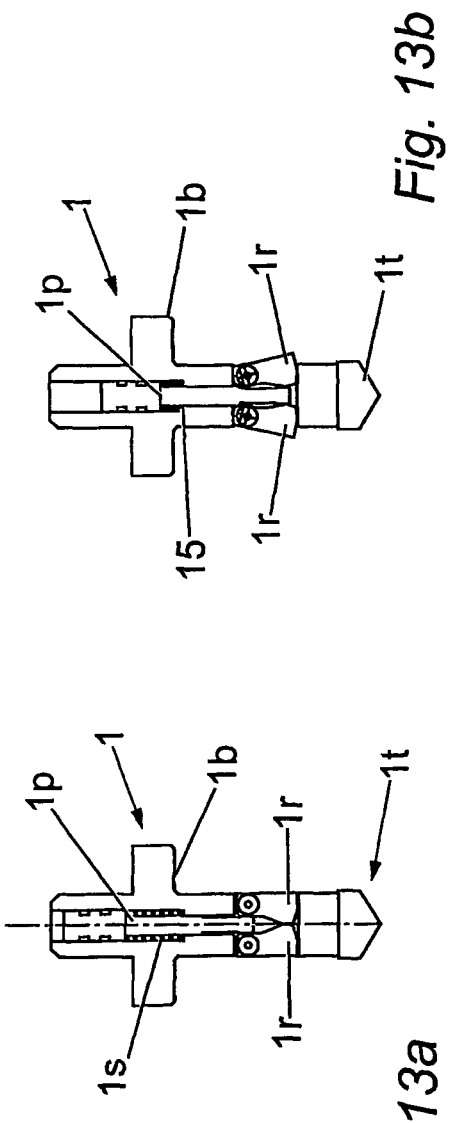 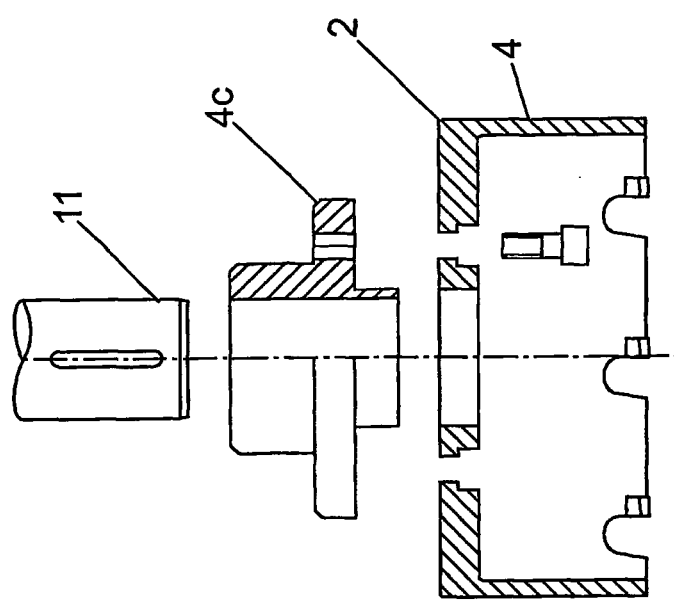
Fig. 13a  Fig. 13b  Fig. 13c  Fig. 13d  Fig. 13e

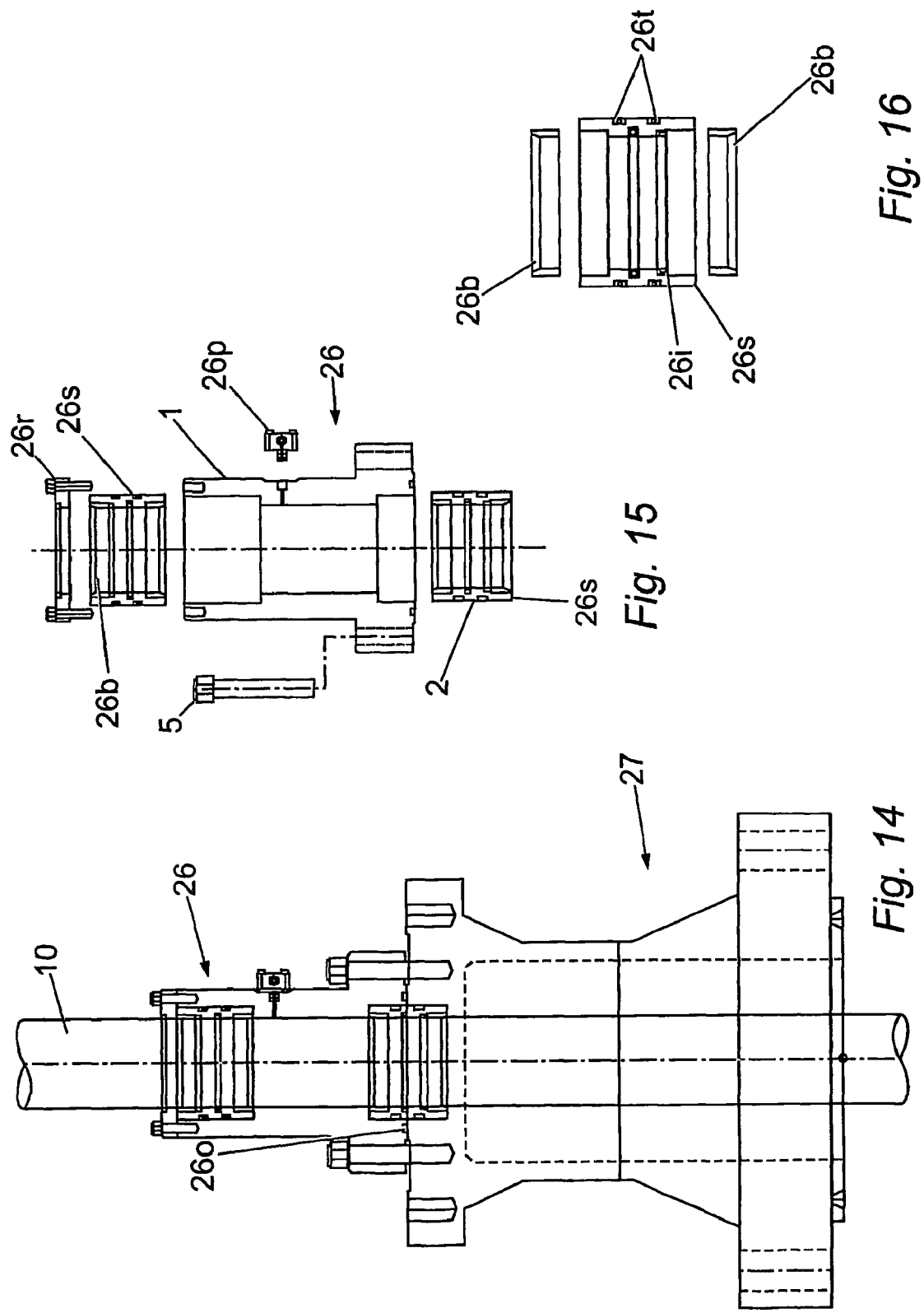

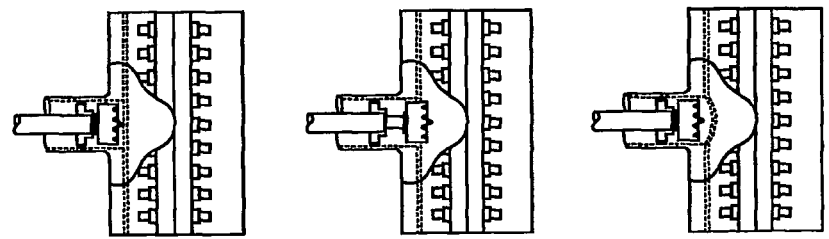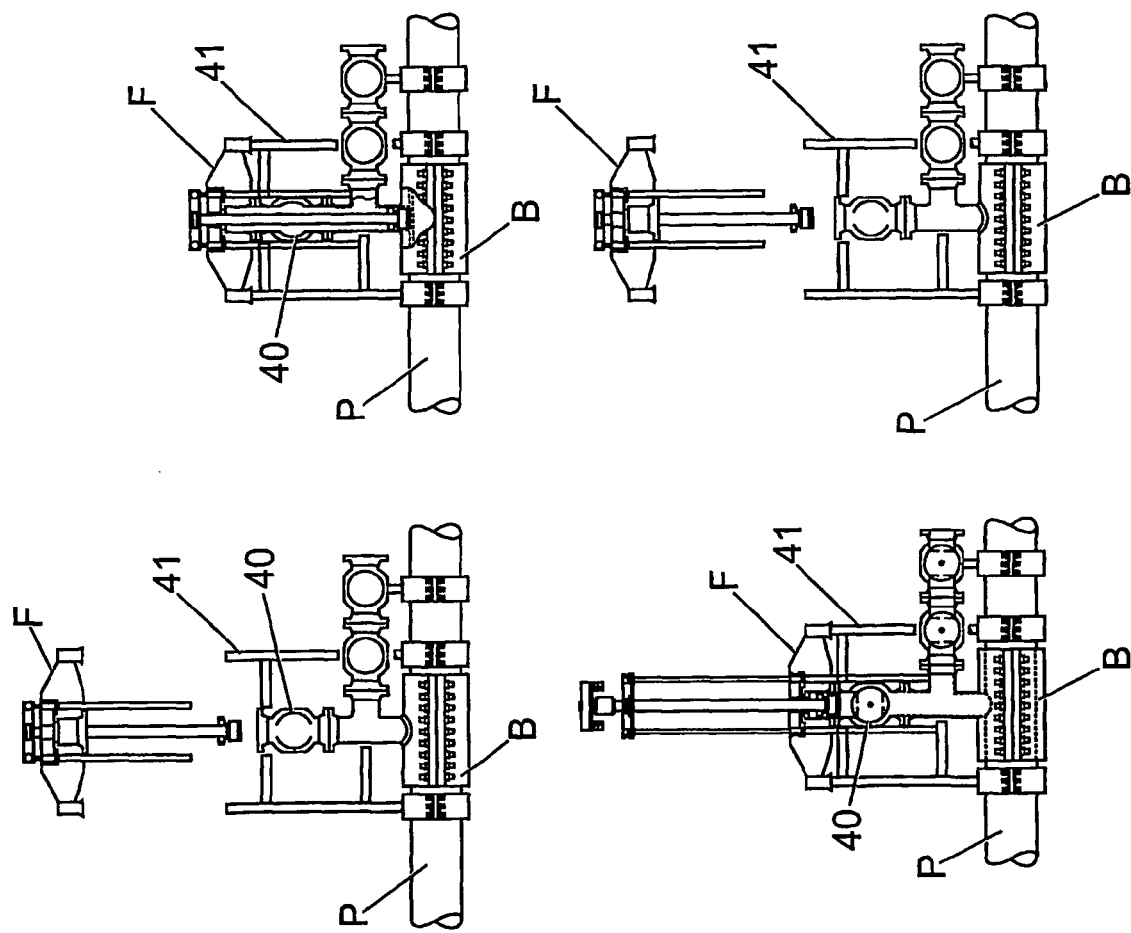
Fig. 25

MAKING CONNECTIONS TO PIPES UNDER PRESSURE

CROSS-REFERENCE TO RELATED APPLICATIONS

This application claims benefit of PCT International application number PCT/GB02/02008filed on May 2, 2002, entitled "Making connections to pipes under pressure", which claims the benefit of British application serial number 0110821.6, filed on May 3, 2001.

This invention relates to methods and apparatus for making connections to pipes and pressure vessels while they are under pressure, a process commonly known as hot tapping.

DESCRIPTION OF THE RELATED ART

Hot tapping is a method of providing a branch connection to an existing pipe line or pressure vessel under operating conditions typically as a method of flowing new product into or out of that line or introducing tooling into a pressurised environment.

The process typically involves the installation of a welded or mechanical connection to the target pipe or vessel and the installation of one or more isolation valves on the connection. A hot tapping assembly is then installed on the outboard end of the isolation valve and a window is cut in the pipeline or vessel using a mechanical hole saw. The hole saw, and coupon of pipeline wall removed, are then withdrawn through the isolation valve(s) and the valve(s) closed. The newly cut hole is then used to extract product from the pipe or to introduce other tooling, such as line stop plugs or corrosion coupons, into the target pipeline or vessel.

Current hot tapping technology has been developed to meet the requirements of the onshore oil and gas industry where installation of branches to existing trunk lines or pressure vessels is a relatively common event.

Current hot tapping machines are normally based on a rotating boring bar fitted with a hole saw type cutting head which is advanced by an internal lead screw mechanism through sets of chevron type seals and the isolation valves into the pressurised environment.

The resultant axial loads and bending moments generated by the line pressure, seal friction and cutting operation are resolved within the boring bar which is in turn restrained by the seal assemblies and lead screw mechanism.

SUMMARY OF THE INVENTION

According to the present invention there is provided apparatus for tapping into a pipe or vessel, the apparatus comprising a cutting tool for cutting through the wall of the pipe or vessel, a first drive mechanism for delivering the cutting tool to the vessel wall and a second drive mechanism for powering the movement of the cutting tool through the wall.

The invention also provides a method of cutting through a wall of a pipe or vessel, the method comprising moving a cutting tool into contact with the wall of the pipe or vessel by means of a first drive mechanism, and cutting through the wall by means of a second drive mechanism.

Typically the first and second drive mechanisms have different gearings, and are preferably entirely different, with the first drive mechanism being adapted for long travel linear movement along the axis of the cutting tool, and the second drive mechanism being adapted for short travel linear movement through the wall of the pipe or vessel.

The first drive mechanism is preferably a linear drive mechanism and typically does not rotate. The second drive mechanism is preferably a rotary mechanism such as a screw thread or worm drive, and is preferably a short travel mechanism.

The invention also provides apparatus for tapping into a pipe or vessel comprising a rotary cutting tool, a non-rotating tool-bearing member, and a drive mechanism for driving the cutting tool through the wall to be cut.

A stuffing box is typically provided for moving the non-rotating tool-bearing member close to the wall.

The non-rotating pressure housing is typically a sealed shaft which can optionally be configured with anyone or more of drive, feed, cutting and centralising assemblies to perform cutting operations by means of the cutting tool.

The tool shaft is typically fed into the pressurised environment through a stuffing box assembly using linear actuators typically acting through a collar on the tool shaft. The linear actuators are typically hydraulically powered, and in preferred embodiments can comprise hydraulic pistons. However, other types of linear actuator can be used.

One advantage of certain embodiments is that the long linear travel associated with passing through the isolation valve(s), typically 1,000-2,000 mm, is divorced from the short cutter travel, typically 100-150 mm, required to perform the actual cutting operation. This allows the two long and short travel systems to be designed independently of one another, and engineering compromises between them can be avoided.

The cutting device can typically comprise a pilot device such as a pilot drill or cutter, and a hole saw or hole cutter. The drive mechanisms for the pilot drill and hole cutter drive can optionally drive both the feed and rotary movements for the pilot drill and hole cutter, but in preferred embodiments the feed and rotary mechanisms are separate.

Typically the shafts of the cutter and the outer housing are sealed and the cutter shaft can preferably be centralised within the outer housing to enhance rigidity of the assembly when the cutter is fully extended into the pipe.

The speed of rotation and rate of feed for the pilot drill and hole cutter can typically be adjusted independently of each other enabling optimum feed and speed rates to be used for the various phases of the cutting operation.

The long-travel first drive mechanism can typically comprise one or more pistons that stroke the shaft of the outer housing into the stuffing box. Typically two or more pistons are used, as this guides the shaft on the desired axis more accurately. The pistons can be hydraulic or pneumatic, but can also be of other designs, or can be substituted for other types of linear drive device, such as worm drives etc.

The first mechanism is typically adapted for rapidly moving the cutter device towards the wall to be cut so that the cutter can then be driven by the second mechanism more slowly, accurately and with a higher degree of control than is necessary for the delivery of the cutter to the face of the wall. Therefore, the first drive mechanism can have very different characteristics from the second drive mechanism without a compromise between the two affecting the accuracy or efficiency of the system.

The invention also provides apparatus for tapping into a pipe or vessel, the apparatus comprising a cutting tool for cutting through the wall of the pipe or vessel, a first shaft to which the cutting tool is attached, and a second shaft co-axial with the first shaft with an annulus between the first and second shafts, wherein one or more control or signal lines are disposed in the annulus.

The first shaft with the cutting tool is typically inside the second shaft.

BRIEF DESCRIPTION OF THE DRAWINGS

An embodiment of the present invention will now be described by way of example and with reference to the accompanying drawings, in which:

FIGS. 4 and 5 are side and sectional views of the FIG. 1 machine tool assembly;

FIGS. 10 and 11 are side views of a bore centraliser;

FIG. 12 is a plan view of the FIG. 10 bore centraliser in use;

FIG. 13 is a series of views of a pilot drill and hole cutter used in the FIG. 1 machine tool assembly;

FIG. 14 is a side sectional view through a stuffing box and valve interface spool as shown in FIG. 2;

FIG. 15 is an exploded view of the FIG. 14 stuffing box;

FIG. 16 is a side view of a seal cartridge used in the FIG. 15 stuffing box;

FIG. 25 is a series of views showing the sequence of operation of the tapping system.

DETAILED DESCRIPTION OF THE INVENTION

Figure 2:
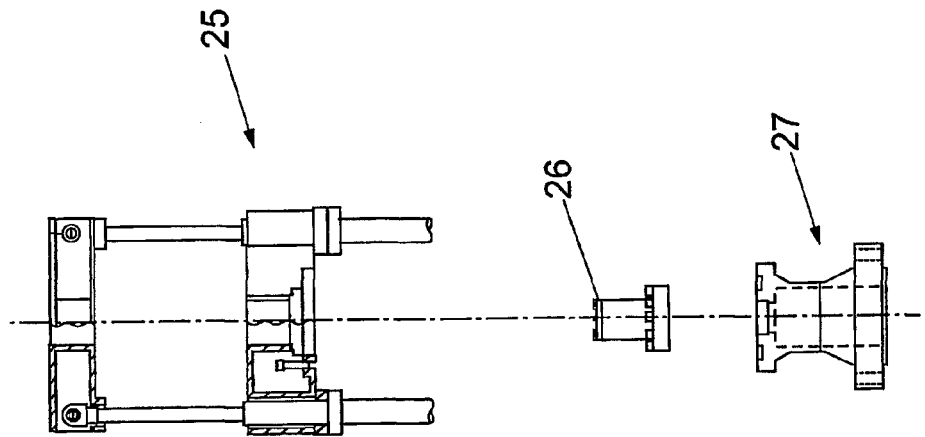
FIG. 2 is a sectional view of an injector assembly, a stuffing box, and a valve interface spool.
Figure 3:
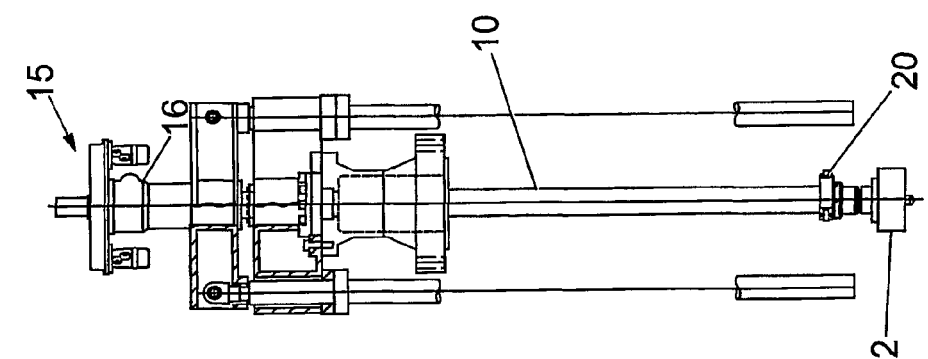
FIG. 3 is a sectional view of a system for tapping into pressurised pipes embodying the FIG. 1 and FIG. 2 assemblies.
Figure 1:
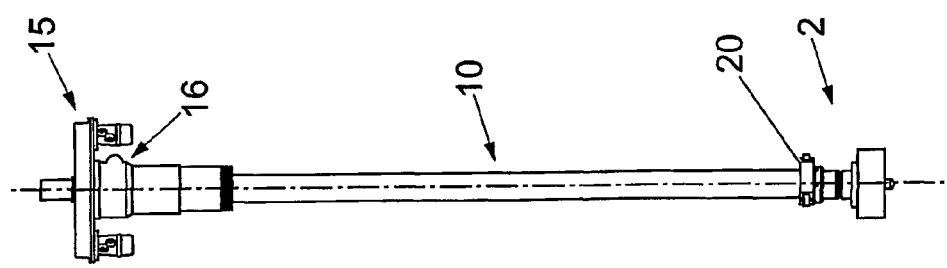
FIG. 1 is a sectional view of a machine tool assembly.
Figure 6:
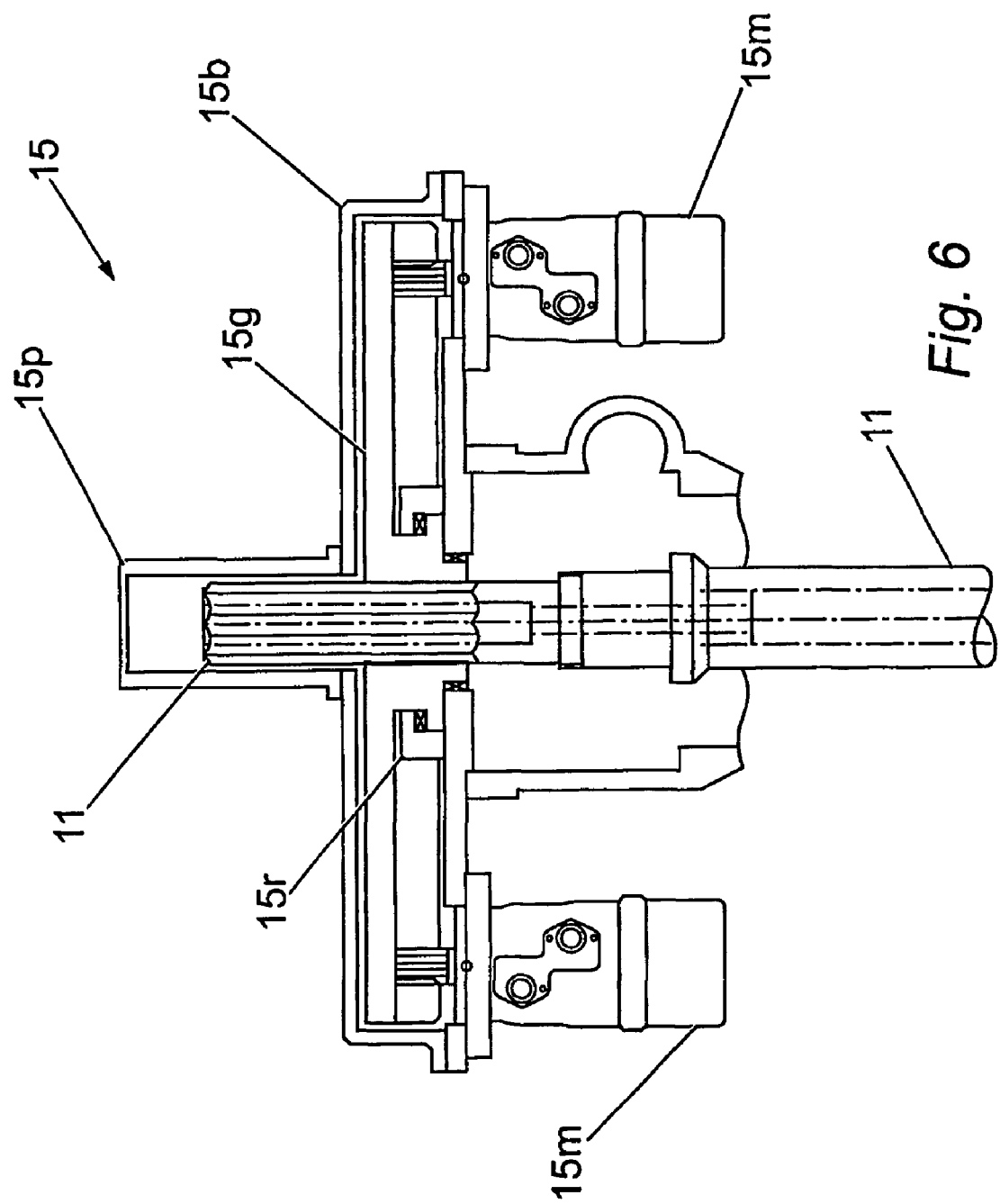
FIG. 6 is a side sectional view of a drive unit of the FIG. 1 machine tool assembly.

Referring now to the drawings, a tapping apparatus has a cutter assembly 2 mounted on the end of a duplex shaft comprising an outer non-rotating shaft 10 and an inner rotating shaft 11 driven by a rotary drive unit 15. A feed unit 16 controls the axial movement of the cutter assembly 2 mounted on the rotating shaft 11 through the wall being cut. Optionally a centraliser 20 can be provided to centralise the outer shaft 10 in the T piece of the pipe.

The shaft 10 and cutter assembly 2 is advanced towards the wall of the pipe through a stuffing box 26 and valve interface spool 27 by an injector assembly 25, shown in FIG. 2.

The drive unit 15 is typically located on the outboard end of the apparatus and provides the rotary drive for the drilling operation through the wall. The drive unit 15 typically comprises a body 15b housing the drive train components and connected to the feed unit 16. Where practical, all of the apparatus bodies can be oil-filled and pressure-compensated for subsea operations. A primary drive gear 15g is retained within drive unit body 15b by bearing assemblies and a retaining ring 15r, and has an internal spline which engages on a corresponding spline on the rotary drive shaft 11. The drive gear 15g is driven by two hydraulic motors 15m mounted on the body 15b and coupled to the drive gear 15g via spur gears. The hydraulic motors 15m coupled to the drive gear 15g generate the torque that is transmitted to the shaft 11 via the internal spline on the drive gear 15g. A pocket 15p on the top of the drive unit housing 15b protects the shaft 11, and allows space for the shaft 11 to move axially as will be described. The hydraulic motors 15m can be hydraulically coupled either in series or in parallel enabling the torque and speed to be switched within differing speed and torque bands. An operator can monitor the speed and direction via a surface or subsea readout from proximity sensors (not shown) located within the unit.

Figure 7:
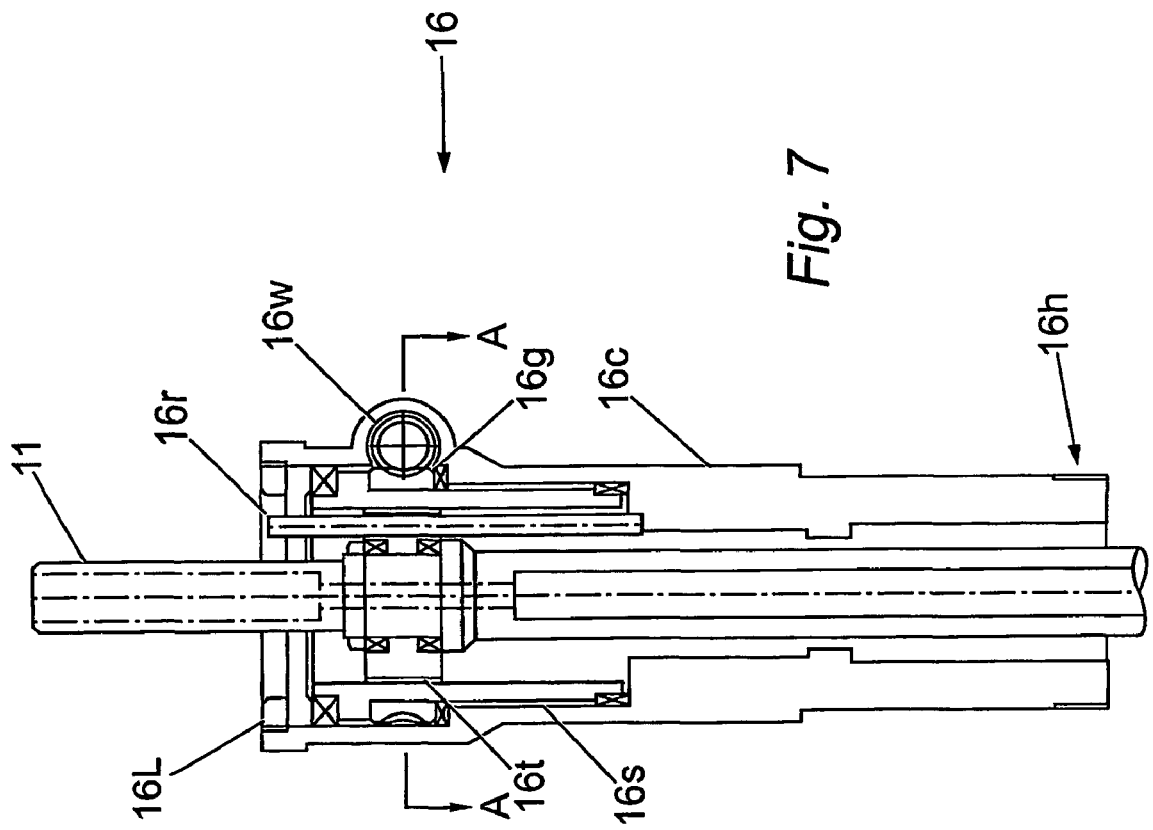
FIG. 7 is a sectional view through a feed unit of the FIG. 6 drive unit.
Figure 8:
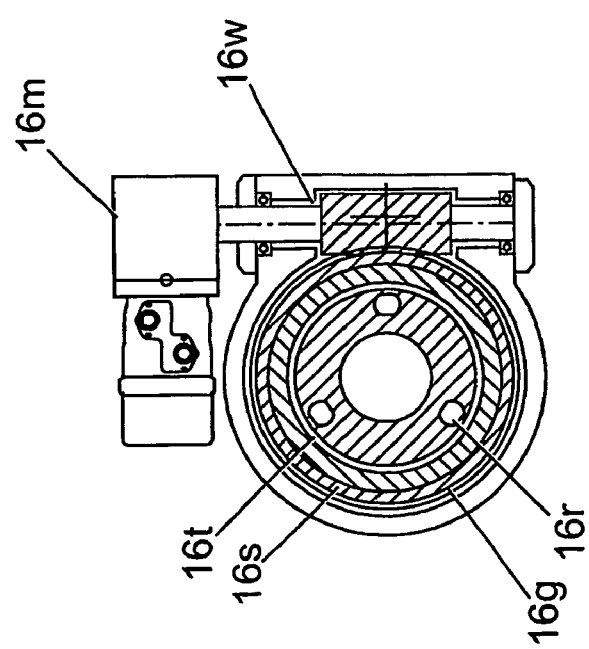
FIG. 8 is a sectional view through FIG. 7 at line A-A.
Figure 9:
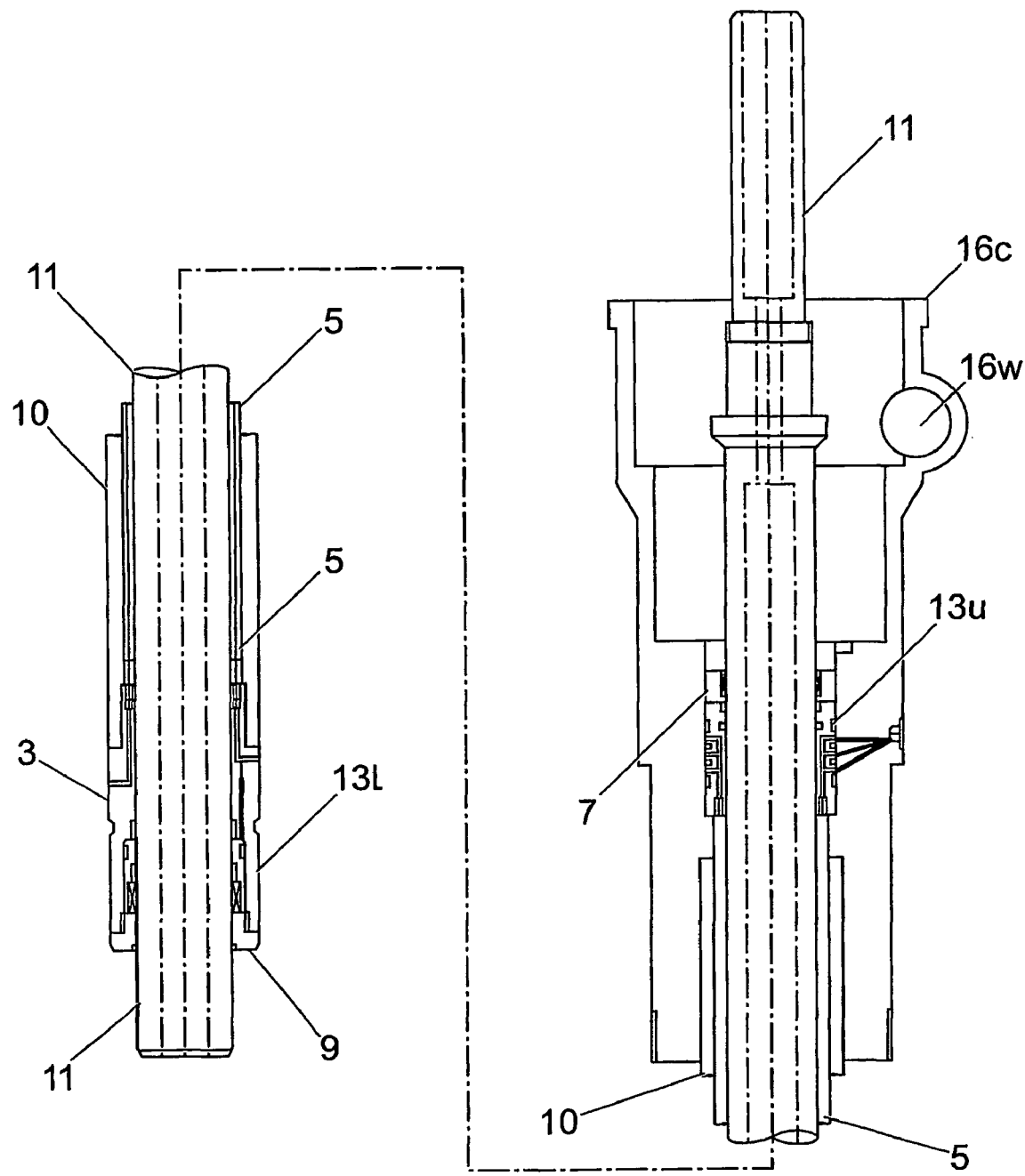
FIG. 9 is a sectional view through the duplex tool shaft of the FIG. 1 machine tool.
Figure 18:
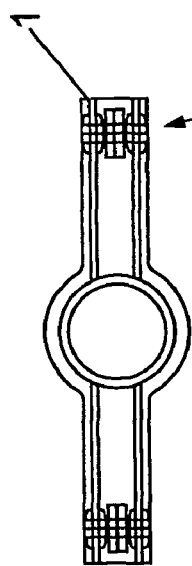
FIG. 18 is a plan sectional view through line B-B of FIG. 17.
Figure 19:
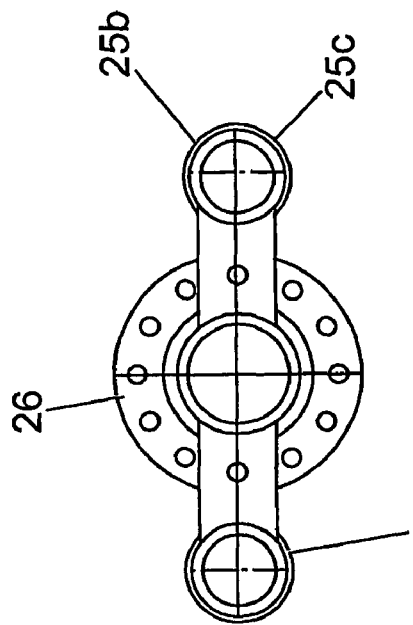
FIG. 19 is a plan view through line C-C of FIG. 17.
Figure 17:
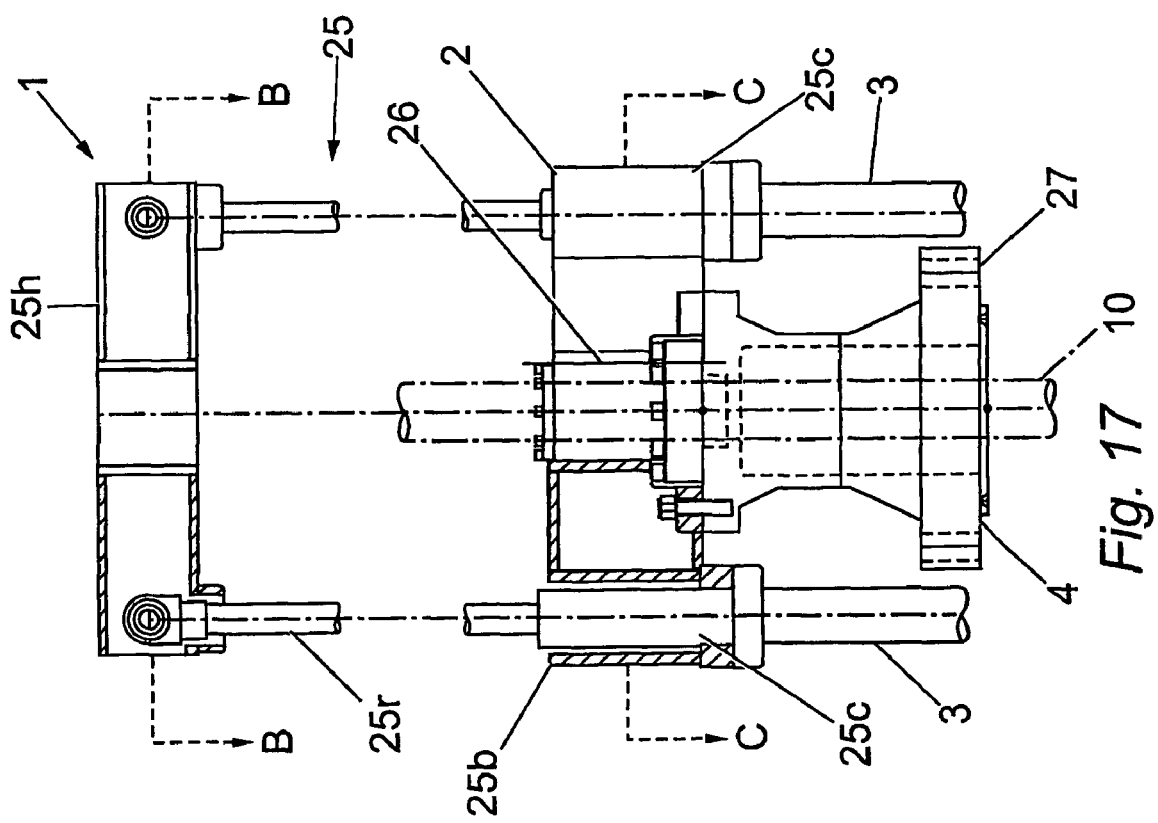
FIG. 17 is a side sectional view through an injector assembly.

The feed unit 16 is housed within a top cap 16c on the outboard end of the duplex shaft and provides a variable axial feed mechanism for the rotary shaft 11 within the outer shaft 10. The feed unit 16 has a thrust collar 16t mounted on the shaft 11 and driven towards the inboard end of the tool (i.e. downwards as shown in FIG. 7) by a thread on its outside diameter engaging with an internal thread on a drive sleeve 16s. Two thrust washers acting back to back and a locking nut retain the collar 16t on the drive shaft 11. The collar 16t is prevented from rotating by the action of several tie-rods 16r that pass through the collar 16t and are anchored within the top cap 16c.

The drive sleeve 16s pushes the thrust collar 16t forward via an internal thread and is driven by a drive gear 16g formed on the outside diameter of the sleeve 16s. The sleeve 16s is retained within the top cap by two thrust roller bearings and a radial roller bearing. The drive gear 16g is secured to the OD of the drive sleeve 16s and transmits torque from a drive worm 16w to the sleeve. The drive worm 16w engages with the drive gear 16g and is driven by the motor 16m and reduction gear. The worm shaft is retained in the tool shaft top cap 16c by two end caps and a pair of bearing assemblies. Tie rods 16r pass through the thrust collar 16t and prevent the collar 16t from rotating under the influence of the drive sleeve 16s. The tie rods 16r are secured at the outboard end by an anchor plate and on their inboard end by engaging in corresponding holes in the top cap 16c. A locking ring 16L secures the drive train components within the top cap 16c. The feed motor 16m drives the worm gear 16w through a reduction gear box and provides the motive power for the axial movement of the shaft 11.

The feed unit 16 provides the finely controlled linear motion necessary to control the axial movement of the drive shaft 11 during the cutting operation. The drive shaft 11 is connected to the thrust collar 16t which is advanced or retracted under the influence of the threads on its outside diameter engaging with the threads on the inside diameter of the drive sleeve 16s. The drive sleeve 16s is driven by a worm and wheel arrangement 16w, which is in turn driven by a reduction gearbox and hydraulic motor 16m. This arrangement enables the rate of feed of the drive shaft 11 to be finely controlled for all stages of the cutting operation independently of the rotation of the pilot drill and cutter assembly 2. Proximity sensors can optionally provide telemetry for accurate monitoring of drive ring speed and direction of movement.

The duplex tool shaft connects via the outer shaft 10 to the inboard end of the feed unit top cap 16c (e.g. by welding) and transmits the rotary cutting power to the cutter assembly 2 whilst maintaining high levels of sealing redundancy on the annular seal path within the outer shaft 10. A control line bundle 5 within the annulus between the shafts 10, 11 provides fluid power for control functions such as actuating tooling, seal flushing, pressure monitoring, centraliser and ancillary function operation, as well as signal lines from sensors and other measuring instruments. The cap 16c provides the mechanical linkage between the drive unit 15 and the outer shaft 10. The cap 16c also provides the locating shoulder and attachment, via a threaded locking collar, to an injector cross head 25h to be described. The cap 16c is oil-filled and pressure-compensated for subsea operations.

The outer shaft 10 houses the inner drive shaft 11 and the annular hydraulic lines 5 and provides the external sealing surface for stuffing box 26 sealing elements (to be described). The shafts 10, 11 are oil-filled and pressure-compensated for subsea operations. The inner drive shaft 11 connects the external drive and feed assemblies, outside the pressurised envelope, to the pilot and cutter assemblies 2, inside the pressurised envelope. It has a splined section where it passes through the drive unit 15, to transmit torque, and an upset shoulder for engagement of the feed system thrust collar 16c. The shaft 11 is connected to the cutter 2 by two keys and to the pilot drill 1 via a threaded arrangement. A hydraulic control line (not shown) can pass through its centre for actuation of the pilot drill coupon retention mechanism. Alternatively, the mechanism can be actuated by means of hydraulic pressure applied direct through the bore of the shaft 11, without a hydraulic line.

Upper 13u and lower 13l seal cartridges are retained by rings 7,9 within the outer shaft 10 and house rotary seal elements that seal against the inner rotary shaft 11. The annular space between the lower cartridge 13l and the outer shaft 10 can be monitored and flushed independently of the annular cavity within the outer shaft 10 via one of the control lines. A bottom cap 3 houses the lower seal cartridge 13l which is retained therein by a retainer ring 9 and optionally has through-porting to connect a hydraulic line e.g. to a bore centraliser or for other functions.

The duplex tool shaft 10,11 provides the rotary drive connection between the drive 15 and feed 16 units, located outside the pressurised environment, and the pilot drill and cutter assembly 2, located inside the pressurised environment, whilst maintaining high levels of sealing redundancy. The outer shaft 10 also contains the control lines and supports the bore centraliser.

The outer shaft 10 outside diameter is hardened and polished providing a sealing surface for stuffing box seals 26s and has a top cap assembly which connects to the drive unit 15 and injector system cross head assemblies.

The drive shaft 11 is captive within the outer shaft 10 and passes through seal cartridges 13 at either end of the outer shaft which provide the primary and secondary environmental barriers on the OD of the drive shaft 11. Keyways and a cutter interface on the inboard end of the drive shaft 11 transmit the power generated by the drive unit 15 to the pilot drill and cutter 2.

A bore centraliser 20 is located on the inboard end of the outer shaft 10. The bore centraliser 20 comprises a body 20b housing radial pistons 20r retained by guide rods with spring assemblies to retract the pistons 20r. The pistons 20r can extend and retract to adjust the position of the centraliser 20 with respect to the bore of the hot tap T piece in which the tool is deployed. The pistons 20r are typically extended by applying hydraulic pressure to the hydraulic lines 5 and are typically withdrawn under spring action with pressure assistance from the pressurised environment surrounding the centraliser 20. Adjustable pads 20p are optionally fitted to the pistons 20r allowing the assembly to be configured for varying bore widths. The body 20b also houses sealing assemblies 20s and is typically rigidly held to the outer shaft 10 by cone head screws 20c locating into a groove (not shown) in the outer shaft 10. Three sets of seals 20s on the inside diameter of the body 20b provide a seal between the body 20b and the outside diameter of the tool shaft 10, and between the hydraulic conduits to the pistons 20r.

The pilot drill and cutter assembly 2 is located on the inboard end of the outer shaft 10 and provides the means of cutting and (optionally) retaining the section of pipeline wall (coupon). The assembly 2 comprises a pilot drill 1 and a cutter 4. The drill comprises a drill body 1b having a removable tip or bit it, one or more coupon retention pawls 1r and a piston assembly 1p. The cutter 4 has a circular cutter blade 4b having brazed tip inserts on its cutting face, and is attached to the end of the shaft 11 by a collar 4c which has two internal keys to transmit the torque from the shaft 10 to the cutter 4. The teeth on the cutter blade 4b are arranged in a staggered pattern thus minimising the power required to perform the primary hole cutting operation.

During the cutting operation the drill 1 and cutter 4 are advanced through the pipeline wall by the drive shaft 11 as it advances under the influence of the feed unit 16.

The coupon retention pawls 1r are held in the withdrawn position shown in FIG. 13a by a spring is acting between the body 1b and the piston 1p until pressure is applied to the back of the piston 1p via the port through the centre of the drive shaft 11, which then strokes forward moving the pawls 1r outward and locking them in the extended or "Coupon Locked" position shown in FIG. 13b once the pawls 1r have passed the coupon, allowing the coupon to be retained behind the pawls as the drill bit it is recovered.

The stuffing box 26 and valve interface spool 27 assemblies provide the primary mechanical and pressure interface to the pipeline isolation valve. The stuffing box 26 provides fully redundant environmental sealing and lateral guidance for the outer tool shaft 10.

The stuffing box 26 is mounted on the outboard end of the valve interface spool 27 and contains the primary and secondary environmental seals and guide bushings 26b. The stuffing box 26 houses seal cartridges 26s and is attached to the valve interface spool 27 via a series of retaining bolts. A port 26p in the body of the stuffing box 26 allows the pressure in the cavity between the seal cartridges 26s to be monitored during cutting operations. An 'O' ring type seal 26o is disposed between the assembled stuffing box 26 and the valve interface spool 27.

A seal cartridge 26s seals between each end of the stuffing box 26 and the outer tool shaft 10. Each cartridge 26s contains two inner annular sealing elements 26i, which seal around the tool shaft 11, and two outer body sealing elements 26t to seal against the stuffing box body 26. A retaining ring 26r secures the outboard seal cartridge 26s within the stuffing box 26.

A pressure monitoring port 26p is attached to the external diameter of the stuffing box body 26 and provides a means of monitoring the pressure between the two seal cartridges 26s.

The stuffing box 26 is sandwiched between the base of the injector assembly 25 and the valve interface spool 27, and provides guidance and annular sealing on the OD of the outer shaft 10. The outer tool shaft 10 passes through the two sealing cartridges 26s where in each assembly two independent sealing elements (a spring energised lip type seal and an 'O' ring energised polymer type seal) provide redundant sealing on the annular leak path around the outer tool shaft 10. Two guide bushings 26b within each seal cartridge 26s impart a high degree of rigidity to the tool shaft 10 as it passes through the stuffing box 26.

The valve interface spool 27 is mounted on the outboard end of the isolation valve and provides a mechanical and pressure linkage between the tapping system and the isolation valve. The spool 27 acts as pressure chamber to house the machine tool components on the inboard end of the tool shaft 10 during deployment and recovery. The stuffing box 26 is mounted on the outboard end of the spool 27.

Porting within the body of the spool 27 enables pressure testing and flushing of the isolation valve prior to hot tapping and also enables the spool 27 to be depressurised on completion of the tapping operation.

The injector base 25b anchors two hydraulic piston cylinders 25c to the stuffing box 26 and spool 27 and transmits the tool shaft torque and axial loading through to these assemblies.

A cross head 25h attaches the hydraulic piston rods 25r to the machine tool shaft top cap 16c via a threaded collar arrangement 16h. The head 25h is a beam type structure and is designed to provide maximum rigidity for transmission of the axial load from the cylinders 25c to the machine tool. The hydraulic pistons generate axial force to overcome end load on the tool shaft 10 due to pipeline pressure and cutting loads. Optional linear motion transducers can provide positional feedback to the control system to determine tooling position.

Figure 20:
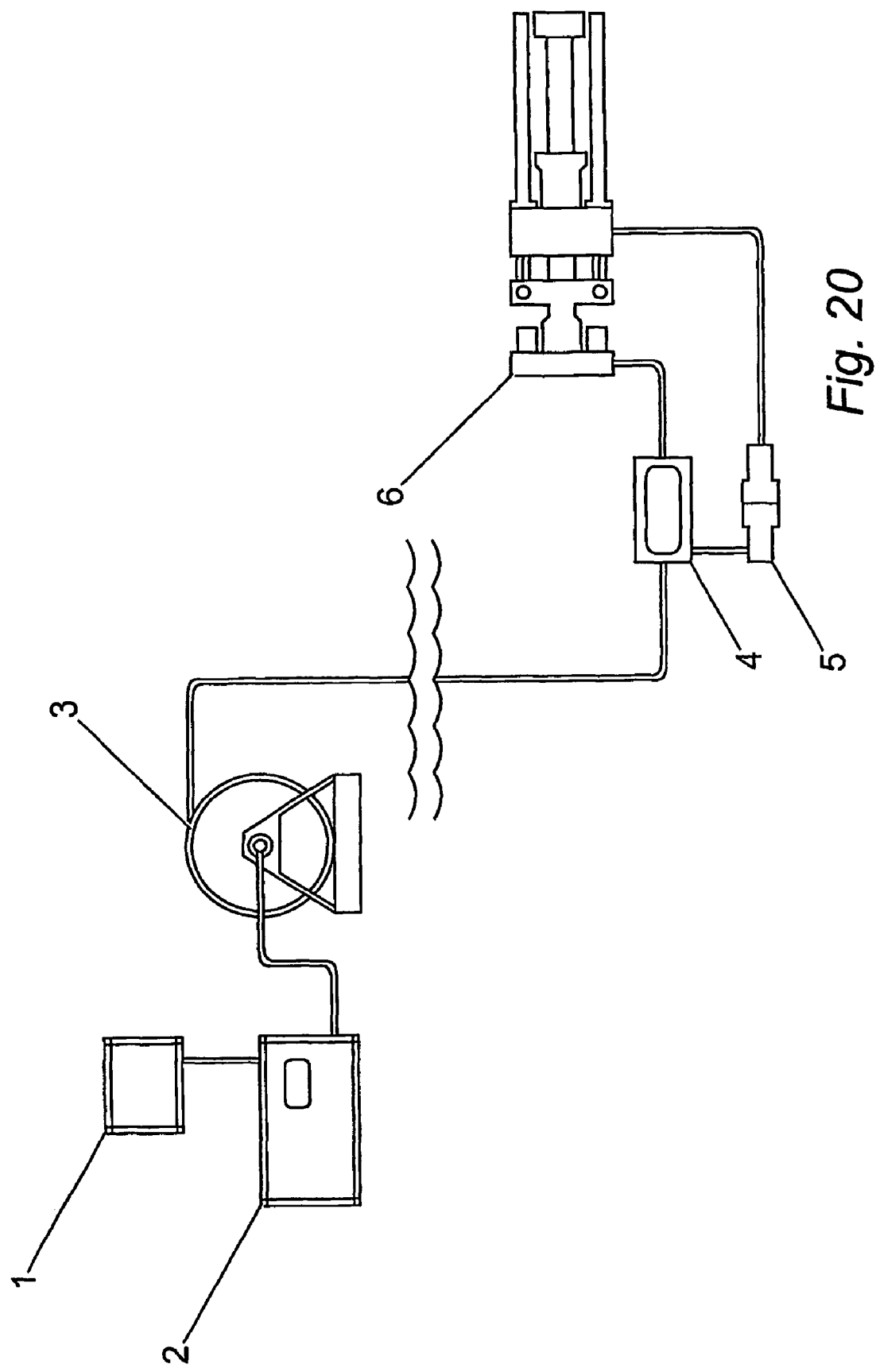
FIG. 20 is a schematic representation of a tapping system.

A control system shown conceptually in FIG. 20 provides control and monitoring functions enabling the system to be operated by a surface operator. As a secondary function the system can provide a level of automatic system shut down in the event of a loss of primary control functions. A hydraulic power pack provides hydraulic power for some of the subsea elements of the system. Two independent fluid supplies are provided; a pressure regulated HP supply for the injector assembly and a flow regulated supply to the machine tool drive motors.

The split supplies ensure that safety critical components and systems that may be contaminated by line fluids are separated from purely tooling requirements. A surface control panel provides the surface operator with the means to control and monitor the hydraulic supplies to the subsea equipment as well as providing tooling information such as speed of cut and tooling position. An electro-hydraulic umbilical and reel connects the surface equipment to the subsea assemblies.

A subsea valve pack housing the hydraulic control valves musters the electrical signals from the various sensors on the subsea assemblies. The valve pack can provide a level of automated system shut down in the event that the surface control and power is lost. Shut down is achieved via an accumulator and secondary pilot operated control valves that can operate the primary hydraulic valves within the system in a predetermined sequence if the surface umbilical is lost or disconnected.

Figure 23:
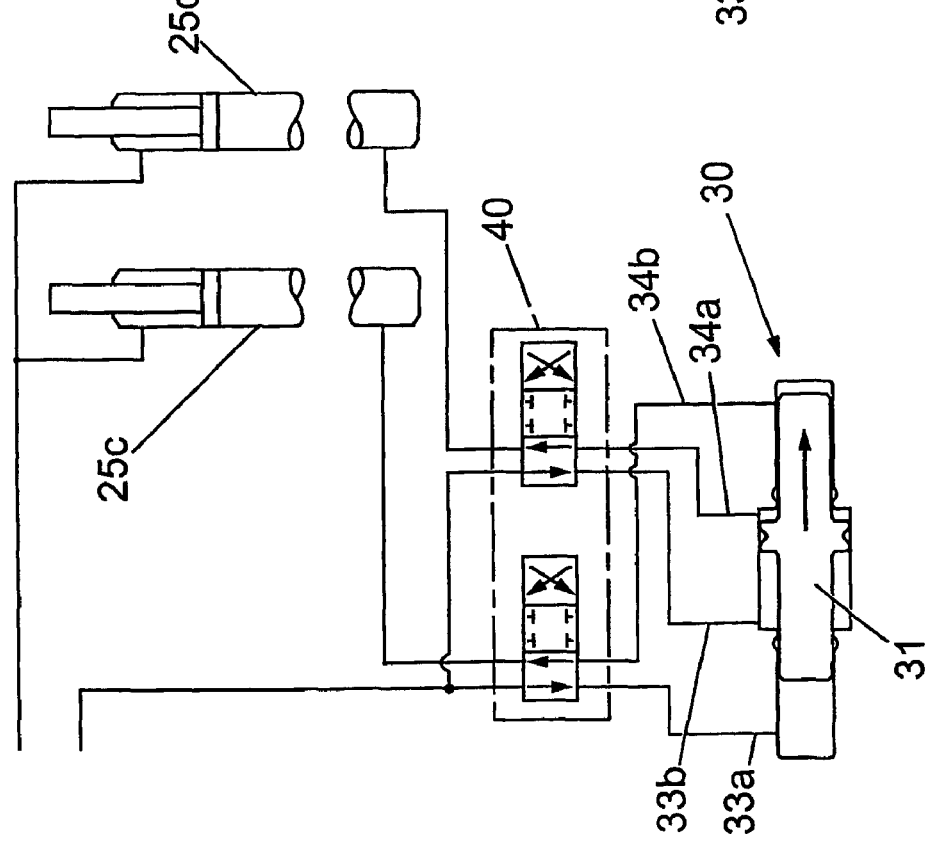

In use, a branch connection B is made to the target pipeline P, by either hyperbaric welding or a mechanical tee fitting, and one or more isolation valves 40 are installed on the branch B. The orientation of the branch B is not a constraint; a vertically orientated branch B is shown in FIG. 23 for illustrative purposes, but other orientations can be equally effective.

The tapping system is conveyed to the sea bed either on guide wires or as an independent tooling package and can be positioned by a divers or a Remotely Operated Vehicle (ROV). The system latched via a handling frame F onto guide posts 41 or stabbed into receptacles on the isolation valve handling frame. The connection between the interface spool 27 and the isolation valve V is made secure to provide a pressure tight seal between the valve V and the tapping system. The interface spool cavity is pressurized via porting in the spool body to prove the integrity of the connection and the sealing systems on the tapping system.

The isolation valve(s) V are then opened, and the hydraulic cylinders 25c then stroke the duplex shaft 10, 11 inward until the pilot drill 1 is at a suitable stand-off from the pipeline wall—typically 5 mm.

The seawater in the valve and spool cavities is displaced using an inert fluid, then the cavity is pressurised until it is 1 to 2 bars above the pipeline operating pressure.

The cutting operation is completed in five distinct stages;
1) The bore centraliser pistons 20r are activated to centralise the duplex shaft 10 (optional step).
2) The drive and feed units 15, 16 are activated and the pilot drill 1 is advanced by the feed unit 16 to drill a pilot hole through the pipeline wall. The pilot drill pawl-extension piston 1p is then activated to extend the pawls 1r ensuring that the pipe wall coupon to be cut is retained on the drill 1 on completion of the cutting.
3) The rotating cutter 2b is advanced forward using the feed unit 16 until cutting of pipeline wall is completed.
4) The drive unit 15 is then stopped and the feed unit 16 reversed to retract the cutter 2b, and the retained pipeline coupon, from the pipeline.
5) The bore centraliser 20 is de-activated ready for withdrawal of the duplex shaft 10.

The injector assembly hydraulic cylinders 25c are then operated to retract the tool shaft 10 until the cutter and pilot drill assembly 2 is within the interface spool 27. The isolation valve(s) V are then closed and interface spool cavity depressurised via the spool test ports. The connection between the interface spool 27 and the isolation valve V is released, and the system unlatched from the isolation valve frame 41.

All of the above stages can be accomplish remotely supported as required by a Remotely Operated Vehicle (ROV).

An optional synchronisation pump 30 provides a means of synchronising the stroke of the two hydraulic cylinders 25c in the injector system 25 to a precise degree.

Figure 21:
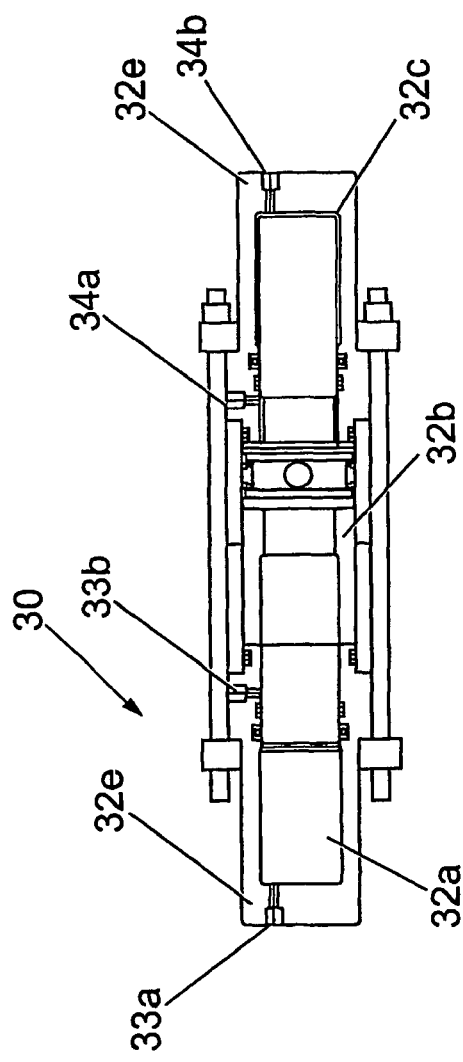
FIGS. 21 and 22 are side views of a synchronisation pump.
Figure 22:
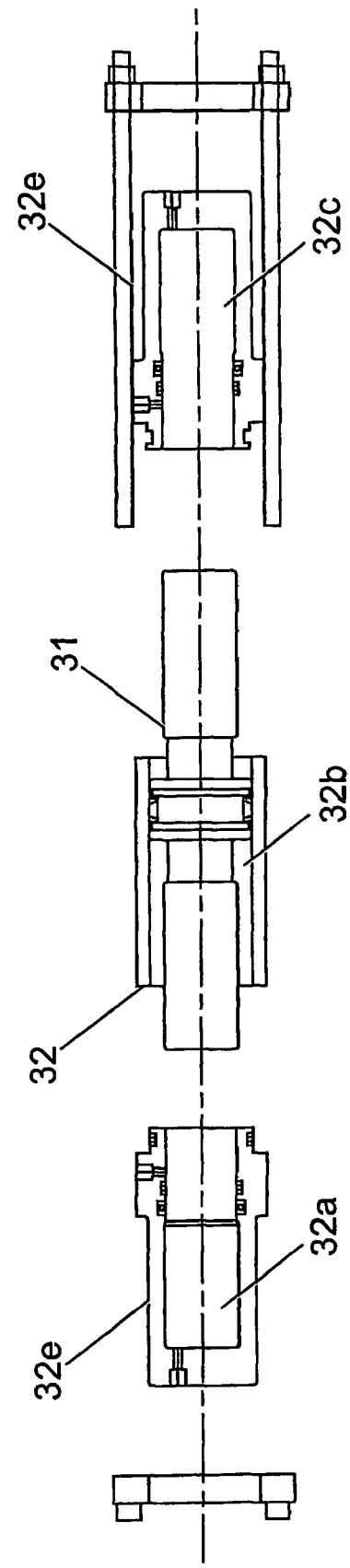

The synchronisation pump 30 comprises a piston 31 having an axial rod with a central annular shoulder. The axial rod has opposite end faces of equal area to the end faces of the annular shoulder. The piston 31 is annularly sealed within a housing comprising a central cylinder 32 with end caps 32e. The housing is divided into three chambers 32a, 32b & 32c), and has ports 33a,b on one side of the central annular shoulder, and ports 34a,b on the opposite side of the shoulder; each port is separated from the other by an annular seal such as an o-ring against which the piston 31 seals in the assembled pump 30. Thus the left hand end port 33a is disposed at the left hand end of the pump 30 in FIG. 21, within the end chamber 32a, and with an o-ring seal between it and the next port 33b, which is spaced axially along the cylinder 32 from the end port 33a, and is located in the mid chamber 32b. The port 34a is also located in the mid chamber 32b and is spaced axially along from the port 33b; in the assembled pump 30 the central annular shoulder of the piston is disposed between the two ports 33b and 34a, and is sealed to the ID of the cylinder 32 by o-rings or the like. The port 34b is located in the end chamber 32c and is spaced axially along the cylinder 32 from the port 34a with an o-ring seal disposed between them.

Thus each port is disposed within a separate chamber 32a, 32b, 32c enclosed within seals, with the central chamber 32b being divided by the central annular shoulder of the piston 31. Because of the matching annular and piston areas the swept volume of these three chambers is equal, resulting in fixed and equal volumes of fluid being displaced from outlet ports on each stroke of the pump 30, irrespective of the direction of the stroke.

In use the ports 33 and 34 are connected to a separate valve block 40 which switches the connections from a fluid supply intermittently between the two pairs of ports 33 and 34, so as to shuttle the piston 31 from one side of the pump 30 to the other, and drive identical amounts of fluid from the pump sequentially through the pairs of ports 33 and 34.

Figure 24:
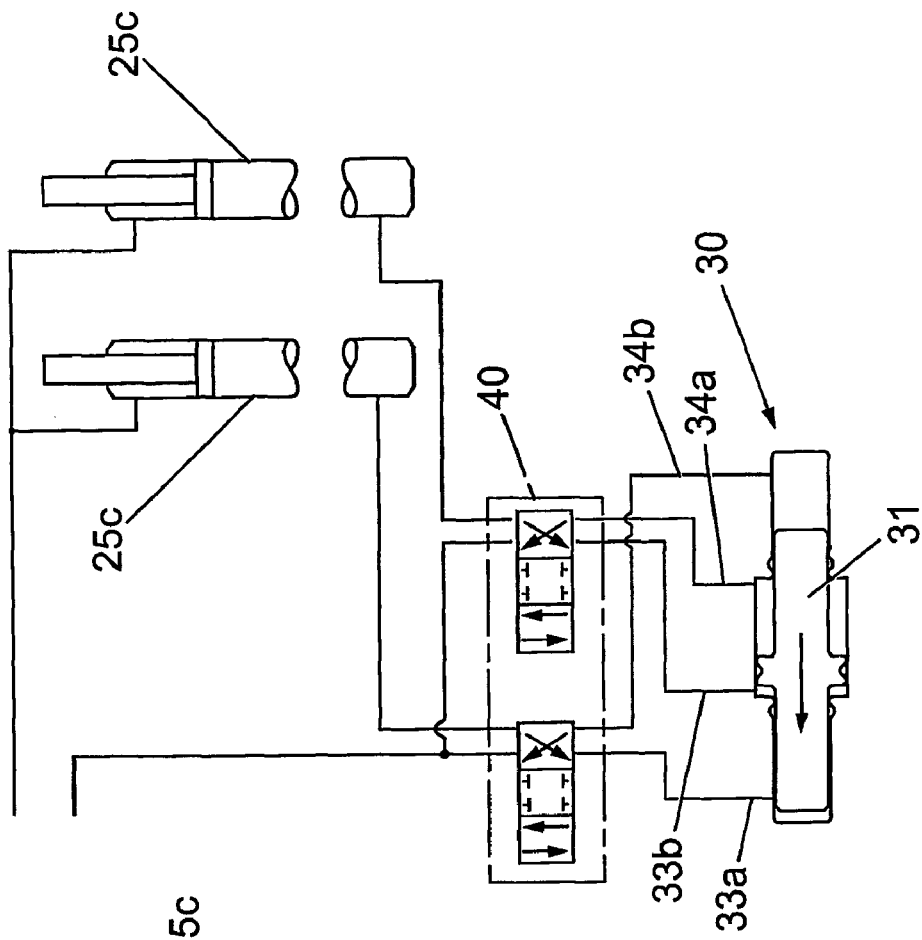
FIGS. 23 and 24 are schematic views of the FIG. 21 pump with the piston in first and second configurations respectively.

In operation, pressure is applied initially to one set of ports 33a, 33b through the valve block 40 with the configuration shown in FIG. 23. This results in the piston 31 moving towards the right as shown in FIG. 23. The annular and piston areas of the piston 31 are equal resulting in equal amounts of fluid being displaced from the two outlet ports 34a, 34b. When the piston 31 reaches the end of the stroke, the valve block 40 is switched manually or automatically to the configuration shown in FIG. 24, where the connections are reversed and pressure is applied to the opposite set of ports 34a, 34b resulting in the piston 31 moving to the left and ejecting fluid through the other ports 33b, 33a. These ports are now linked through the valve block 40 to the cylinders 25c and extend the pistons by a further quantum amount. Meter in and out is achieved by reversing the tank and pressure lines.

Repeated strokes of the pump are used to deliver metered volumes of fluid to the hydraulic cylinders resulting in matched movement of the cylinders.

A piston of this design forms another part of the invention. Accordingly the invention also provides a hydraulic piston assembly comprising a chamber and a piston sealed to the chamber and movable therein, wherein the chamber has first and second ports for entry and exit of fluid, the ports being isolated by the piston seals to form separate compartments within the assembly, wherein the volume of fluid swept from each of the compartments by movement of the piston in the chamber is substantially equal.

Typically the areas of the piston sweeping the various compartments are substantially equal. The areas can be end faces of piston rods or annular upsets on the rods.

Preferably there are two pairs of ports, and each port can typically function as an entry port or an exit port.

In certain embodiments of the invention, it is beneficial to divorce the long linear travel of the assembly through the isolation valves V towards the wall to be cut, from the short travel needed to advance the cutter accurately through that wall.

A non-rotating tool shaft 10 and separate rotating drive shaft 11 separates the role of the axial seals around the tool shaft 10 from the role of the rotary seals around the drive shaft 11 and enables them to be selected for optimum performance.

With the duplex shaft, hydraulic (and other) control lines can be deployed within the annulus between the shafts to facilitate operation of the bore centraliser 20, to flush seals, and to operate ancillary tooling.

The use of wholly independent drive and feed mechanisms 15, 16 enables the speed of the cutting assemblies and the rate of axial feed to be varied independently of each other, thereby allowing greater control of the delicate cutting operation.

The actuable bore centraliser 20 enables the cutting head to be centralised and restrained allowing the hole size to be optimised for a given application.

A synchronisation pump to advance or retract the cylinders 25c accurately ties the motion of the two drive cylinders to each other, facilitating the accurate delivery of the cutter to the wall of the pipe.

A subsea valve pack with piloted control valves coupled to sequenced control valve enables the system to be returned to a safe condition on the loss of surface control.

Hydraulically actuated pawls as a coupon retention device within the pilot drill, actuated independently of the drive shaft rotation or other rotary shaft, are also an advantage.

Modifications and improvements can be incorporated without departing from the scope of the invention.

The invention claimed is:

1. Apparatus for tapping into a pipe or vessel, the apparatus comprising:
    a cutting tool for cutting through a wall of the pipe or vessel;
    a first shaft coaxial with a second shaft, wherein the cutting tool is mounted on an end of the second shaft, the second shaft being housed within the first shaft;
    a first actuator that is arranged to act on the first shaft and actable to provide a first drive mechanism for delivering the first and second coaxial shafts and the cutting tool to the wall and a second actuator arranged to act on the second shaft and actable to provide a second drive mechanism to drive the second shaft axially relative to the first shaft, thereby powering the movement of the cutting tool through the wall, wherein a component of the first drive mechanism is coupled to the second drive mechanism so as to move the second drive mechanism and the first and second coaxial shafts together towards the wall, and wherein the second drive mechanism is capable of acting independently from the first drive mechanism to power movement of the cutting tool through the wall.

2. Apparatus as claimed in claim 1, wherein the first drive mechanism is adapted for long travel linear movement along the axis of the cutting tool, and the second drive mechanism is adapted for short travel linear movement through the wall.

3. Apparatus as claimed in claim 1, wherein the first drive mechanism is a linear drive mechanism.

4. Apparatus as claimed in claim 1, wherein the second drive mechanism is a rotary mechanism.

5. Apparatus as claimed in claim 1, having a centralizing device to centralize the apparatus within a tubular.

6. Apparatus as claimed in claim 1, having a stuffing box for moving the cutting tool close to the wall.

7. Apparatus as claimed in claim 1, wherein the first drive mechanism comprises at least one linear actuator(s) to move the cutting tool towards the wall.

8. Apparatus as claimed in claim 1, wherein the cutting tool has a pilot device and a hole cutter.

9. Apparatus as claimed in claim 1, wherein the speed of rotation and the rate of feed for the cutting tool are independently adjustable.

10. Apparatus as claimed in claim 1, wherein the first drive mechanism comprises at least one hydraulic piston.

11. Apparatus as claimed in claim 1, wherein the first drive mechanism comprises two hydraulic pistons connected in parallel to the cutting tool.

12. Apparatus as claimed in claim 11, wherein the movement of the pistons is controlled by a metering assembly.

13. Apparatus as claimed in claim 1, having a coupon retention device to retain and recover a part of the wall that is cut by the cutting tool.

14. A method of cutting through a wall of a pipe or vessel, the method comprising:
    providing a cutting tool, a first drive mechanism having a first actuator and a first shaft, wherein the first actuator is arranged to act on the first shaft, and a second drive mechanism having a second actuator and a second shaft and coaxial with the first shaft, wherein the second actuator is arranged to act on the second shaft, the second shaft being housed within the first shaft, wherein the cutting tool is mounted on an end of the second shaft, wherein a component of the first drive mechanism is coupled to the second drive mechanism so as to move the second drive mechanism and the first and second coaxial shafts together towards the wall;

actuating the first drive mechanism and thereby moving the first and second shafts towards the wall to bring the cutting tool into contact with the wall of the pipe or vessel; and actuating the second drive mechanism independently of the first drive mechanism to drive the second shaft axially relative to the first shaft and thereby cutting through the wall.

15. A method as claimed in claim 14, wherein the first and second drive mechanisms are controlled independently from one another.

16. Apparatus as claimed in claim 1, comprising an annulus between the first and second shafts, wherein one or more control or signal lines are disposed in the annulus.

17. Apparatus as claimed in claim 1, having an enclosure for sealing against the vessel or the pipe in the region to be tapped, wherein the enclosure has an opening for receiving the first and second coaxial shafts with seals disposed between the coaxial shafts and the opening such that a pressure retaining enclosure is provided around the region to be tapped.

18. Apparatus as claimed in claim 17, wherein the pressure retaining enclosure is provided with one or more ports that allow selective pressurization of the enclosure.

19. A method as claimed in claim 14, including sealing an isolation valve to the pipe or vessel in the region to be tapped, feeding the coaxial shafts and cutting tool through the isolation valve and cutting through a wall of a pipe or vessel such that the pipe or vessel pressure is substantially maintained throughout the cutting operation, and wherein the first and second actuators do not pass through the isolation valve.

20. Apparatus for tapping into a pipe or vessel, the apparatus comprising: a cutting tool for cutting through a wall of the pipe or vessel; a first shaft coaxial with a second shaft, wherein the cutting tool is mounted on an end of the second shaft, the second shaft being housed within the first shaft; a first actuator that is arranged to act on the first shaft and actable to provide a first drive mechanism for delivering the first and second coaxial shafts and the cutting tool to the wall and a second actuator arranged to act on the second shaft and actable to provide a second drive mechanism to drive the second shaft axially relative to the first shaft, thereby powering the movement of the cutting tool through the wall, wherein a component of the first drive mechanism is coupled to the second drive mechanism so as to move the second drive mechanism and the first and second coaxial shafts together towards the wall, and wherein the second drive mechanism is capable of acting independently from the first drive mechanism to power movement of the cutting tool through the wall, the apparatus further comprises an enclosure for sealing against the vessel or the pipe in the region to be tapped, wherein the enclosure has an opening for receiving the first and second coaxial shafts with seals disposed between the coaxial shafts and the opening such that a pressure retaining enclosure is provided around the region to be tapped, and wherein the first and second actuators are adapted to move the first and second shafts respectively through the enclosure, without the first and second shafts passing into the enclosure.

21. Apparatus as claimed in claim 20, wherein the coaxial shafts are coupled to a cross member that is also coupled to the enclosure such that forces generated by the drive mechanisms are resolved through the cross member and back to the enclosure.

22. A method of cutting through a wall of a pipe or vessel, the method comprising:

providing a cutting tool, a first drive mechanism having a first actuator and a first shaft coupled to the cutting tool, wherein the first actuator is arranged to act on the first shaft, and a second drive mechanism having a second actuator and a second shaft coupled to the cutting tool and coaxial with the first shaft, wherein the second actuator is arranged to act on the second shaft;

sealing an isolation valve to the pipe or vessel in the region to be tapped;

actuating the first drive mechanism, feeding the coaxial shafts and cutting tool through the isolation valve and thereby moving the cutting tool into contact with the wall of the pipe or vessel; and actuating the second drive mechanism independently of the first drive mechanism and thereby cutting through the wall; and substantially maintaining the pressure within the pipe or vessel throughout the cutting operation.

23. A method as claimed in claim 22, comprising the step of resolving forces generated by the drive mechanisms through a cross member that is coupled to the isolation valve.

24. Apparatus for tapping into a pipe or vessel, the apparatus comprising: a cutting tool for cutting through a wall of the pipe or vessel; a first actuator that is arranged to act on a first shaft coupled to the cutting tool and actable to provide a first drive mechanism for delivering the cutting tool to the wall and a second actuator arranged to act on a second shaft that is coaxial with the first shaft, wherein the second shaft is coupled to the cutting tool and actable to provide a second drive mechanism for powering the movement of the cutting tool through the wall, and wherein the second drive mechanism is capable of acting independently from the first drive mechanism to power movement of the cutting tool through the wall, the apparatus further comprising an enclosure for sealing against the vessel or the pipe in the region to be tapped, wherein the enclosure has an opening for receiving the first and second coaxial shafts with seals disposed between the coaxial shafts and the opening such that a pressure retaining enclosure is provided around the region to be tapped, wherein the pressure retaining enclosure is provided with one or more ports that allow selective pressurization of the enclosure.

25. A method of cutting through a wall of a pipe or vessel, the method comprising:

providing a cutting tool, a first drive mechanism having a first actuator and a first shaft coupled to the cutting tool, wherein the first actuator is arranged to act on the first shaft, and a second drive mechanism having a second actuator and a second shaft coupled to the cutting tool and coaxial with the first shaft, wherein the second actuator is arranged to act on the second shaft;

actuating the first drive mechanism and thereby moving the cutting tool into contact with the wall of the pipe or vessel; and actuating the second drive mechanism independently of the first drive mechanism and thereby cutting through the wall;

sealing an isolation valve to the pipe or vessel in the region to be tapped, feeding the coaxial shafts and cutting tool through the isolation valve and cutting through a wall of a pipe or vessel such that the pipe or vessel pressure is substantially maintained throughout the cutting operation, and wherein the first and second actuators do not pass through the isolation valve.

* * * * *